United States Patent
Hsieh

(10) Patent No.: US 7,156,549 B2
(45) Date of Patent: Jan. 2, 2007

(54) DIRECT TYPE BACKLIGHT UNIT

(75) Inventor: Chih Chieh Hsieh, Sinyuan Township, Pingtung County (TW)

(73) Assignee: Hannstar Display Corp. (TW)

( * ) Notice: Subject to any disclaimer, the term of this patent is extended or adjusted under 35 U.S.C. 154(b) by 30 days.

(21) Appl. No.: 10/925,958

(22) Filed: Aug. 26, 2004

(65) Prior Publication Data

US 2005/0146895 A1    Jul. 7, 2005

(30) Foreign Application Priority Data

Jan. 6, 2004    (TW) .............................. 93100280 A

(51) Int. Cl.
*F21V 7/04*    (2006.01)

(52) U.S. Cl. ...................... 362/633; 362/382; 362/632; 362/561

(58) Field of Classification Search ................ 362/382, 362/23, 632, 633, 634, 559, 561, 614, 603
See application file for complete search history.

(56) References Cited

U.S. PATENT DOCUMENTS

| 4,943,689 | A  | * | 7/1990 | Siefer et al. ............. 178/18.11 |
| 6,407,781 | B1 |   | 6/2002 | Kitada |
| 6,417,833 | B1 |   | 7/2002 | Takemoto |
| 2002/0044437 | A1 | * | 4/2002 | Lee .............................. 362/31 |
| 2004/0012763 | A1 |   | 1/2004 | Yu et al. |
| 2004/0120161 | A1 | * | 6/2004 | Hwang ........................ 362/558 |
| 2005/0225992 | A1 | * | 10/2005 | Idei et al. .................... 362/382 |

FOREIGN PATENT DOCUMENTS

JP    10-326517    12/1998

* cited by examiner

*Primary Examiner*—Sandra O'Shea
*Assistant Examiner*—Jacob Y. Choi

(57) ABSTRACT

A direct type backlight unit includes a metal housing having a base, at least one metal supporting pin and a buffer element. The metal supporting pin is formed integrally on the base and protrudes upwardly therefrom for supporting an optical film disposed upon the backlight unit, and the buffer element is disposed between the metal supporting pin and the optical film so as to prevent the metal supporting pin from damaging the optical film.

14 Claims, 5 Drawing Sheets

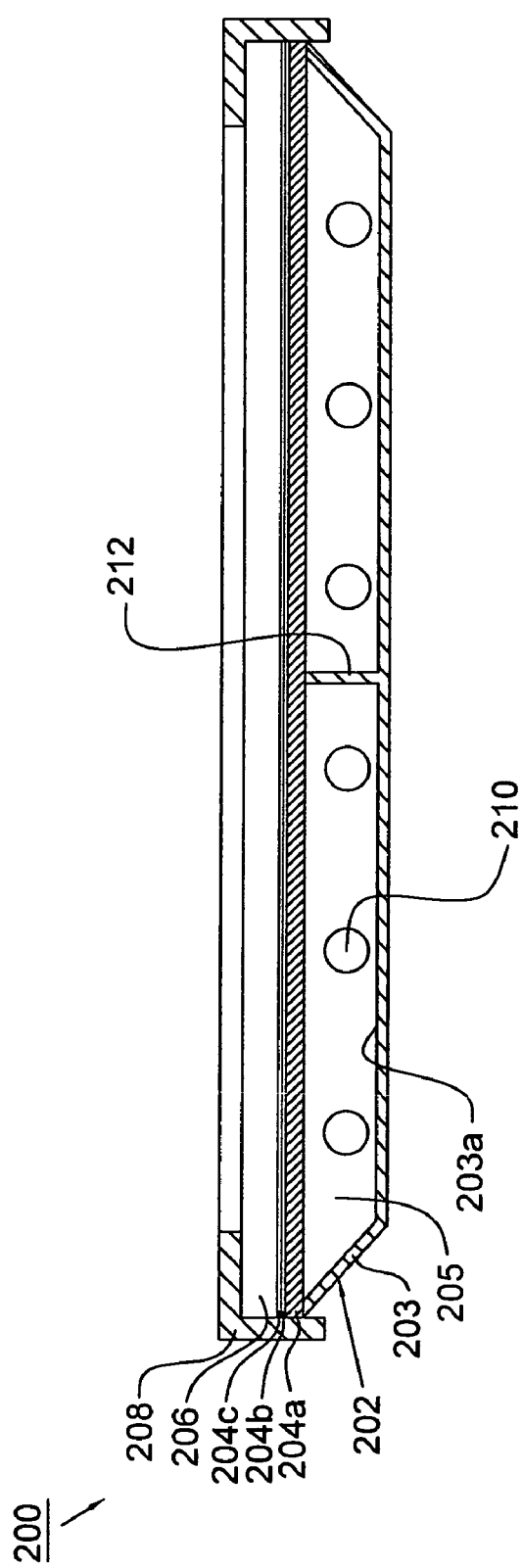
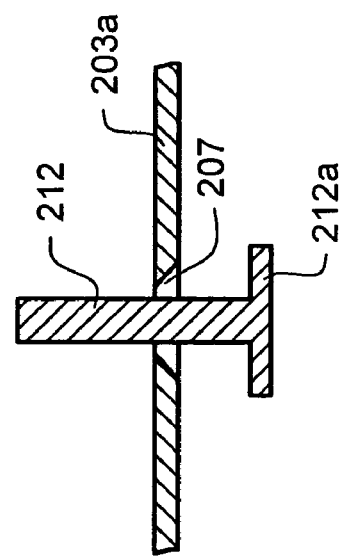
FIG. 5b
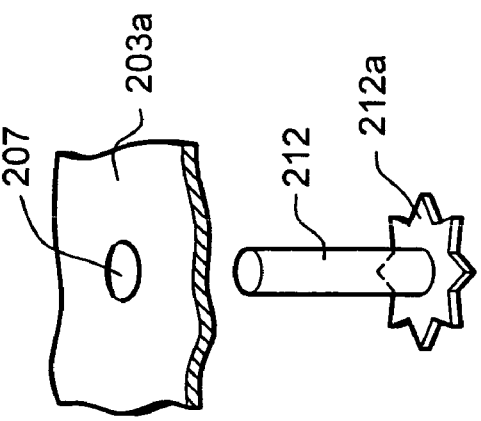
FIG. 5a
FIG. 4

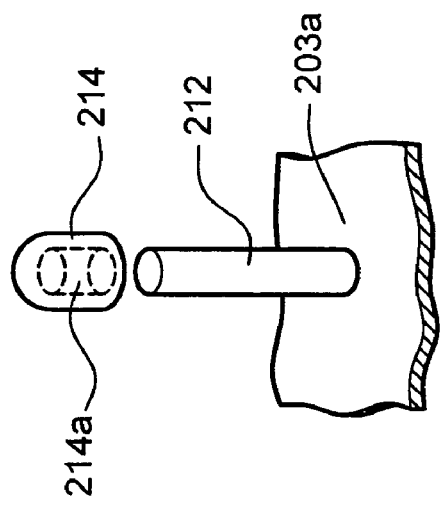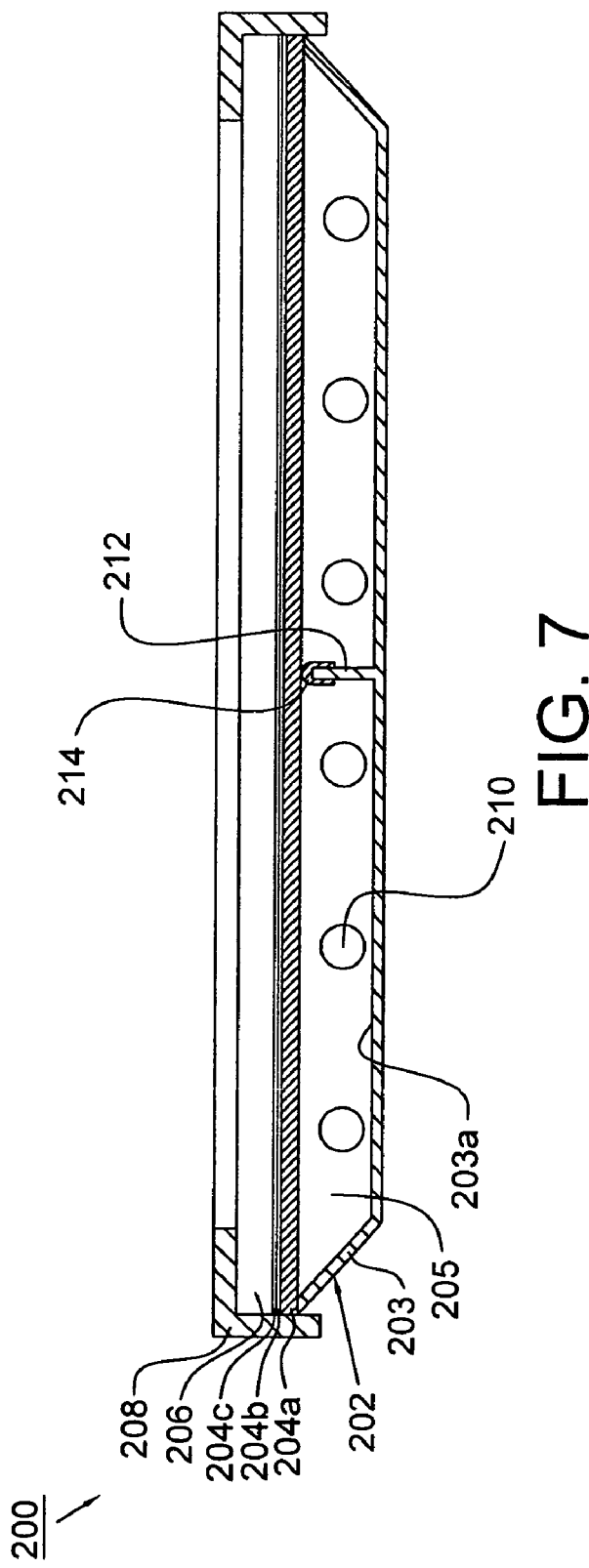

DIRECT TYPE BACKLIGHT UNIT

RELATED APPLICATIONS

The present application is based on, and claims priority from, Taiwanese Application Serial Number 093100280, filed Jan. 6, 2004, the disclosure of which is hereby incorporated by reference herein in its entirety.

BACKGROUND OF THE INVENTION

1. Field of the Invention

This invention generally relates to a direct type backlight unit, and more particularly to a direct type backlight unit having a supporting pin formed integrally therein.

2. Description of the Related Art

Due to the advance of electronic technology, especially for the popularity of portable electronic products, the requirements of light, compact and low-energy consuming display are gradually increasing. With the advantages of low-energy consuming, low-heat dissipation, light weight and non-luminescence, liquid crystal displays (LCD) have been widely used in the electronic products and even have replaced the traditional CRT displays.

In general, a liquid crystal display usually comprises a backlight unit for providing light to its liquid crystal panel. However, the liquid crystal display may use different kinds of backlight units depending on its use and size. These backlight units mainly include two types, i.e. a direct back light type (or direct type) and an edge light type. The present invention herein is related to the direct type backlight unit, and thus only the direct type backlight unit will be described in following descriptions.

Referring to FIG. 1, it shows an exploded schematic view of a liquid crystal display 100 having a direct type backlight unit in the prior art. The liquid crystal display 100 includes a backlight unit 102, a set of optical films 104, a liquid crystal panel 106 and a frame 108. The backlight unit 102 is disposed under the liquid crystal panel 106 for distributing the light from a light source uniformly over the surface of the liquid crystal panel 106. The backlight unit 102 comprises a metal housing 103 and lamps 100, such as cold cathode fluorescent lamps (CCFL), disposed at the base of the metal housing 103. The set of optical films 104 is disposed between the backlight unit 102 and the liquid crystal panel 106 and includes a diffuser 104a disposed upon the backlight unit 102 and a plurality of optical sheets, such as a diffusing sheet 140b and a prism sheet 140c, disposed on the diffuser 104a. The frame 108 is disposed upon the liquid crystal panel 106 and the set of optical films 104 and connected to the backlight unit 102 so as to fix the liquid crystal panel 106 and the set of optical films 104 on the backlight unit 102. FIG. 2 shows a cross-sectional view of the assembled liquid crystal display 100 taken along line A—A in FIG. 1.

The lamps 110 are spacedly disposed on the cavity 105 formed by the metal housing 103 and positioned under the display area of the liquid crystal panel 106 so as to distribute the light uniformly over the surface of the liquid crystal panel 106. Further, since the lamps 110 need to keep a certain distance from the diffuser 104a, at least one supporting pin 112 is required to be disposed on the base 103a of the metal housing 103 for supporting the diffuser 104a such that the lamps 110 can keep a fixed distance from the diffuser 104a.

In the prior art, the supporting pin 112 is a white or transparent conical pin, which is typically made of polycarbonate (PC) or PMMA by the injection molding process. In addition, the base 103a of the metal housing 103 is covered with an adhesive film (not shown), and the supporting pin 112 adheres to the base 103a of the metal housing 103 by the adhesive film.

However, the reliability of such an adhesion manner to fix the supporting pin 112 on the base 103a of the metal housing 103 is usually poor.

Accordingly, the present invention provides a direct type backlight unit having a supporting pin formed integrally therein so as to solve the reliability problem of the supporting pin.

SUMMARY OF THE INVENTION

It is an object of the present invention to provide a direct type backlight unit having a supporting pin formed integrally therein so as to solve the reliability problem of the supporting pin.

It is another object of the present invention to provide a direct type backlight unit having a supporting pin formed integrally therein wherein the supporting pin has a buffer element disposed thereon so as to prevent itself from damaging an optical film.

In order to achieve the above objects, the present invention provides a direct type backlight unit comprising a metal housing, at least one metal supporting pin and a buffer element. The metal supporting pin is formed integrally on a base of the metal housing and protrudes upwardly from the base for supporting an optical film disposed upon the backlight unit, and the buffer element is disposed between the metal supporting pin and the optical film so as to prevent the metal supporting pin from damaging the optical film.

According to the direct type backlight unit of the present invention, the metal supporting pin is formed integrally on the base of the metal housing by the press forming process so as to solve the reliability problem of the supporting pin. Further, the buffer element is preferably a white buffer cap and caps on the metal supporting pin so as to prevent the metal supporting pin from damaging the optical film.

BRIEF DESCRIPTION OF THE DRAWINGS

Other objects, advantages, and novel features of the present invention will become more apparent from the following detailed description when taken in conjunction with the accompanying drawings.

FIG. 4 is a cross-sectional view of the assembled liquid crystal display taken along line B—B in FIG. 3.

FIGS. 5a and 5b are respectively an enlarged perspective view and an enlarged cross-sectional view for illustrating how the metal supporting pin is to be formed on the metal base.

FIG. 6 is a schematic view of the combined structure of a buffer cap and the metal pin.

FIG. 7 is a cross-sectional view of a liquid crystal display according to another embodiment of the present invention.

DETAILED DESCRIPTION OF THE PREFERRED EMBODIMENT

Figure 1:
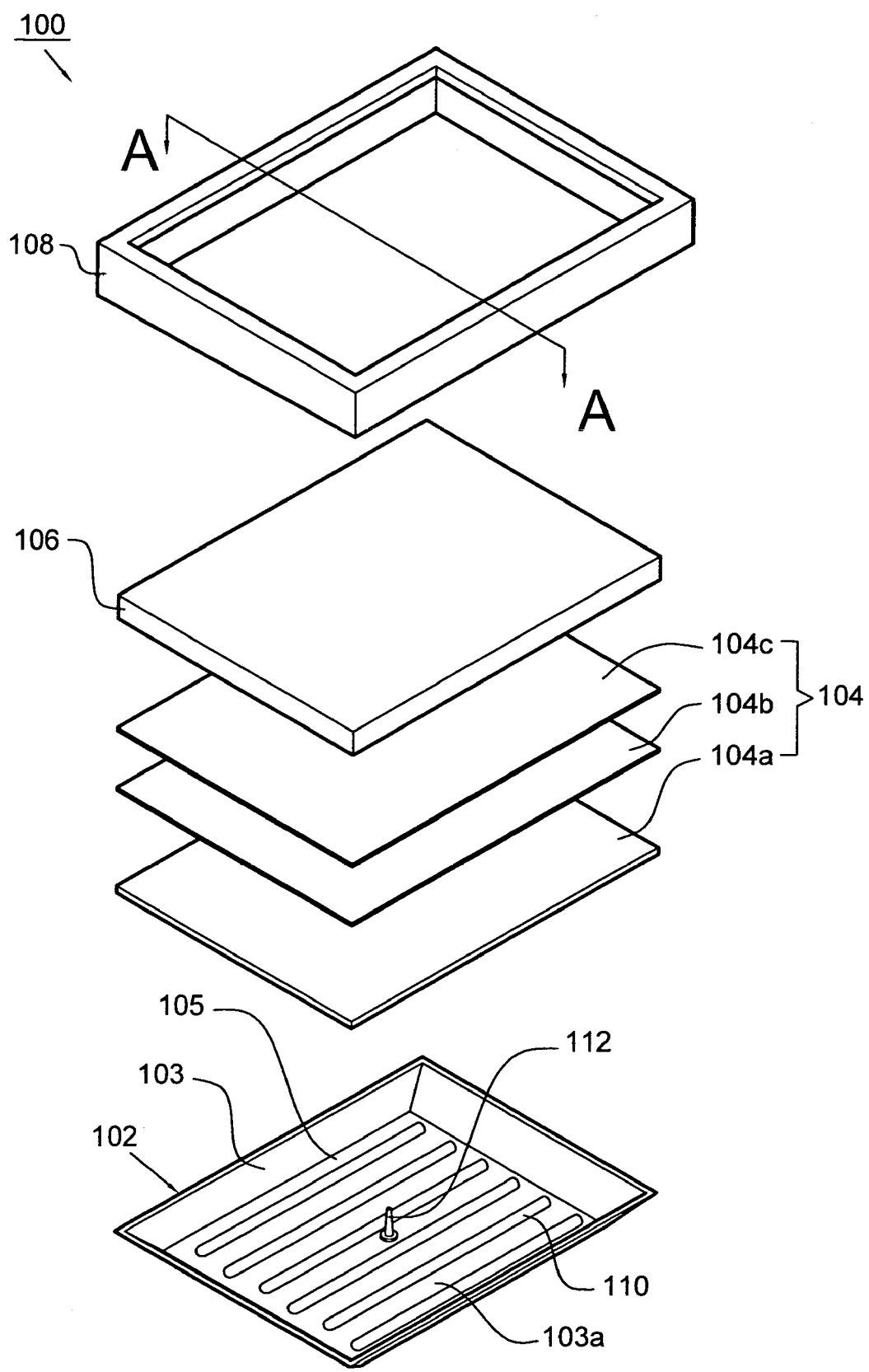
FIG. 1 is an exploded schematic view of a liquid crystal display having a direct type backlight unit in the prior art.
Figure 2:
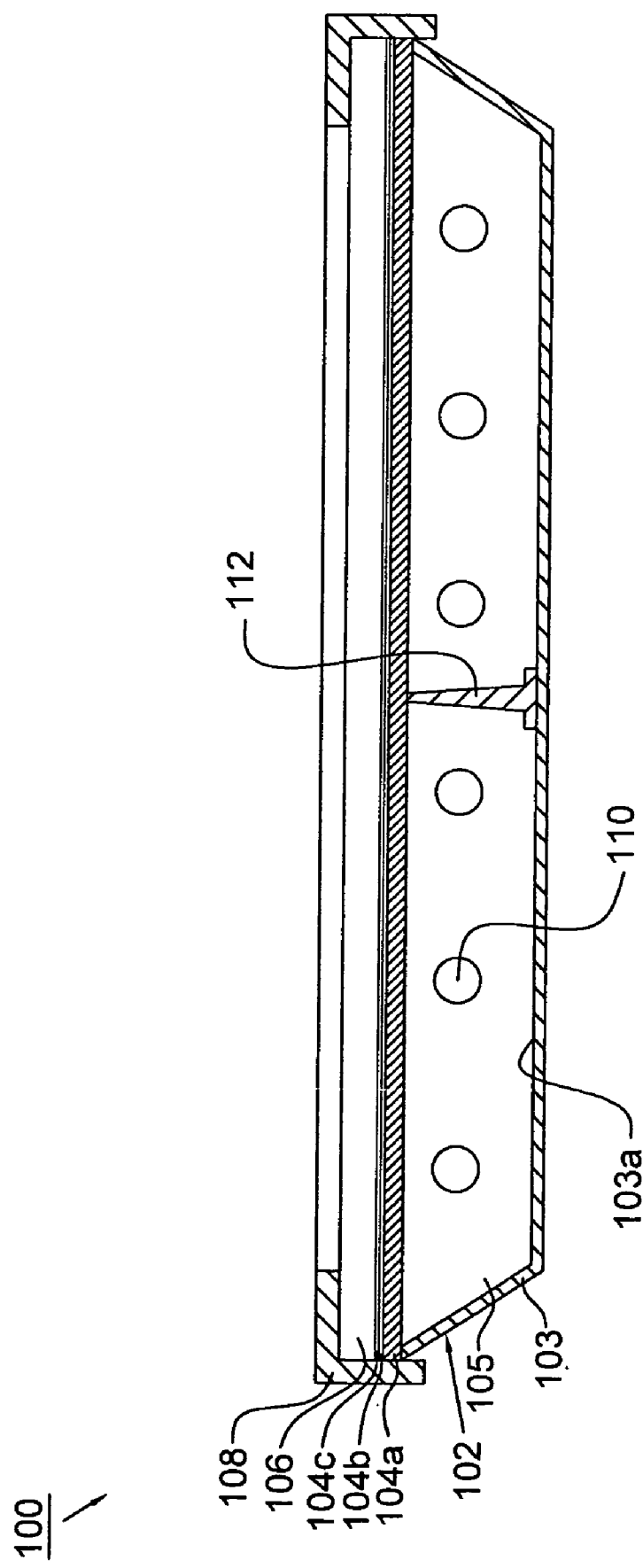
FIG. 2 is a cross-sectional view of the assembled liquid crystal display taken along line A—A in FIG. 1.
Figure 3:
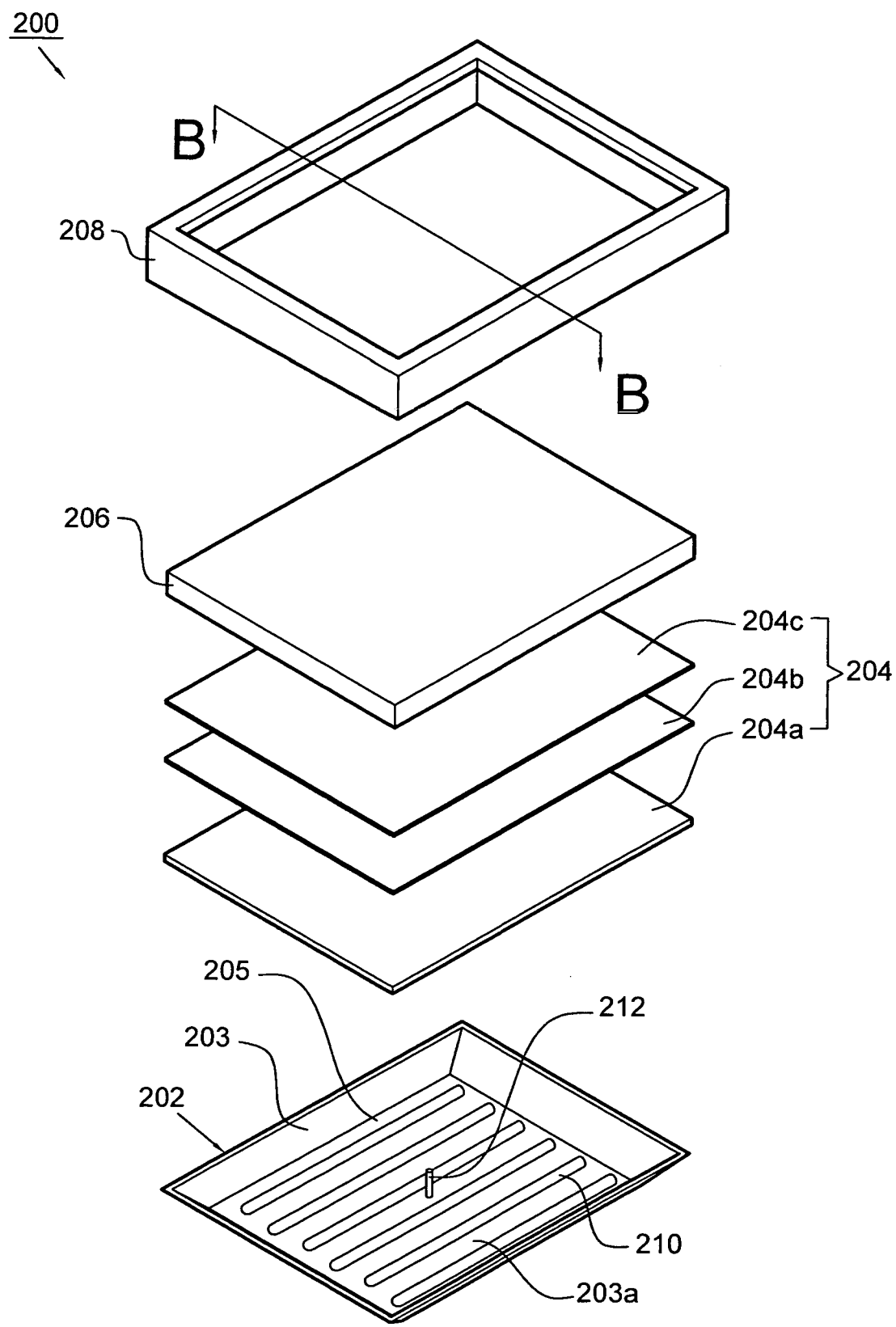
FIG. 3 is an exploded schematic view of a liquid crystal display according to one embodiment of the present invention.

FIG. 3 is an exploded schematic view of a liquid crystal display 200 according to one embodiment of the present invention. The liquid crystal display 200 comprises a liquid crystal panel 206 for producing an image and a direct type backlight unit 202 for emitting light to the liquid crystal panel 206. A set of optical films 204 is disposed between the backlight unit 202 and the liquid crystal panel 206. The set of optical films 204 includes a diffuser 204a disposed upon the backlight unit 202 and a plurality of optical sheets, such as a diffusing sheet 204b and a prism sheet 204c, disposed on the diffuser 204a. The diffuser 204a is disposed upon the backlight unit 202 and typically made of half-transparent polyethylene terephthalate (PET), polyethylene terephthalate, or polycarbonate for further evenly diffusing the light emitted from the backlight unit 202. Then, the diffused light will pass through the plurality of optical sheet, such as the diffusing sheet 204b and the prism sheet 204c, and finally reach the liquid crystal panel 206. A frame 208 is disposed upon the liquid crystal panel 206 for fixing the liquid crystal panel 206 and the set of optical films 204 upon the backlight unit 202.

Now referring to FIG. 4, it is a cross-sectional view of the assembled liquid crystal display taken along line B—B in FIG. 3. The backlight unit 202 comprises a metal housing 203, which defines a cavity 205 for accommodating a plurality of lamps 210 such as cold cathode fluorescent lamps (CCFL). The lamps 210 are spacedly disposed on the cavity 205 and positioned under the set of optical films 204, so as to emit light to the set of optical films 204 and then distribute it uniformly over the surface of the liquid crystal panel 206 while the light passes through the set of optical films 204.

The metal housing 203 includes a metal base 203a having a metal supporting pin 212 disposed thereon and protruding upwardly therefrom for supporting the diffuser 204a. The metal supporting pin 212 is formed integrally on the metal base 203a so as to form a firmly fixed structure, and therefore provided with higher reliability.

FIGS. 5a and 5b are respectively an enlarged perspective view and an enlarged cross-sectional view for illustrating how the metal supporting pin is to be formed on the metal base. The supporting pin 212 is a cylindrical metal pin with a polygonal base 212a and the metal base 203a has a hole 207 before the metal supporting pin 212 is formed integrally on the metal base 203a. Preferably, the diameter of the cylindrical metal pin is about 1.0 mm to 1.5 mm. The hole 207 tapers off from the bottom surface toward the top surface of the metal base 203a (as shown in 5b), and the cylindrical metal pin 212 is to be inserted into the hole 207 from the bottom surface and then formed integrally on the metal base 203a by the press forming process.

The metal supporting pin 212 according to the present invention preferably has a buffer element disposed on its top so as to prevent itself from damaging the diffuser 204a. The buffer element is preferably made of a material of which the hardness is lower than that of the diffuser 204a.

FIG. 6 is a schematic view of the combined structure of a buffer cap 214 and the metal supporting pin 212. The buffer element can be made into the buffer cap 214 shown in FIG. 6, and the buffer cap 214 is preferably white and made of silicon rubber. The buffer cap 214 is a cap having a domelike top and defines a combination hole 214a for capping the top of the metal supporting pin 212. FIG. 7 is a cross-sectional view of a liquid crystal display 200 according to another embodiment of the present invention. The top of the metal supporting pin 212 is capped with the buffer cap 214 shown in FIG. 6, such that the metal supporting pin 212 is prevented from directly contacting the diffuser 204a and thus can be prevented from damaging the diffuser 204a by such a manner.

It should be noted that the presently disclosed embodiments are to be considered in all respects as illustrative and not restrictive. For example, there can be a plurality of metal supporting pins 212 to be evenly formed on the metal base 203a such that each lamp 210 can keep a fixed distance from the diffuser 104a. In addition, the metal supporting pin 212 can be formed in any shapes (such as conical shape) and therefore should not be limited to the cylindrical shape as illustrated in above embodiments of the present invention.

According to the direct type backlight unit of the present invention, the metal supporting pin for supporting the diffuser is formed integrally on the metal housing of the direct type backlight unit by the press forming process so as to solve the conventional reliability problem of the supporting pin. Further, the metal supporting pin has a buffer element, which is preferably a white buffer cap, disposed thereon so as to prevent the metal supporting pin from damaging the optical film supported thereby.

In addition, one feature of the present invention is that a supporting pin for supporting an optical film is formed integrally on the housing of a backlight unit and has a buffer element disposed thereon so as to prevent itself from damaging the supported optical film. Therefore, it should be understood that the material of the supporting pin and the housing of the backlight unit in the embodiment of the present invention are not limited to metal, and the uses of other materials such as plastic, resin or some hardened substances are also falling into the scope of the present invention.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A direct type backlight unit, comprising:
   a housing having a base and side walls extending upwardly from a peripheral region of said base, said base and said side walls together defining a cavity;
   at least a lamp disposed in said cavity;
   an optical film disposed on top of the side walls of said housing; and
   at least on supporting pin protruding upwardly from a middle region the base and supporting the optical film from below;
   wherein
   said base has a through hole in the middle region thereof, said through hole having opposite upper and lower openings, and the upper opening being smaller that the lower opening;
   said supporting pin includes a post member sized to be passable through the upper opening of the through hole, and a base member connected to a lower end of said post member and sized to be not passable through said upper opening;
   said base member is received in the through hole thereby fixing said supporting pin to said base;
   said post member extends upwardly from said base member through said upper opening into cavity of said housing and terminates at an upper end on which the optical film is supported; and said backlight unit further comprises a buffer element being disposed between the upper end of the post member and the optical film and preventing direct physical contact between the upper end of the post member and the optical film.

2. The direct type backlight unit as claimed in claim 1, wherein the housing and the supporting pin are made of metal.

3. The direct type backlight unit as claimed in claim 2, wherein the supporting pin is formed integrally on the base of the housing by a press forming process.

4. The direct type backlight unit as claimed in claim 3, wherein the press forming process is processed by inserting a metal supporting pin into a hole defined in the base of the housing so as to make the supporting pin formed integrally on the base of the housing.

5. The direct type backlight unit as claimed in claim 1, wherein the housing and the supporting pin are made of plastic.

6. The direct type backlight unit as claimed in claim 1, wherein the housing and the supporting pin are made of resin.

7. The direct type backlight unit as claimed in claim 1, wherein the supporting pin is cylindrical in shape.

8. The direct type backlight unit as claimed in claim 1, wherein the supporting pin is conical in shape.

9. The direct type backlight unit as claimed in claim 1, wherein the buffer element is made of silicon rubber.

10. The direct type backlight unit as claimed in claim 1, wherein the buffer element is a buffer cap configured to cap the top of the supporting pin.

11. The direct type backlight unit as claimed in claim 10, wherein the buffer cap is made of silicon rubber.

12. The direct type backlight unit as claimed in claim 10, wherein the buffer cap is white.

13. The direct type backlight unit as claimed in claim 1, wherein the optical film is a diffuser.

14. The direct type backlight unit as claimed in claim 1, wherein said buffer element is a cap having an inner space which receives therein the upper end of said post member; and a material of said cap is different from a material of said post member and softer than a material of said optical film.

* * * * *